(12) United States Patent
Strelow et al.

(10) Patent No.: US 6,230,733 B1
(45) Date of Patent: May 15, 2001

(54) SELF-CONTAINED RUPTURE DISK CARTRIDGE

(75) Inventors: John L. Strelow; Alan Wilson, both of Broken Arrow, OK (US)

(73) Assignee: Oklahoma Safety Equipment Co., Broken Arrow, OK (US)

( * ) Notice: Subject to any disclaimer, the term of this patent is extended or adjusted under 35 U.S.C. 154(b) by 0 days.

(21) Appl. No.: 09/488,372

(22) Filed: Jan. 20, 2000

(51) Int. Cl.[7] .................................................. F16K 17/16
(52) U.S. Cl. ..................... 137/68.23; 137/68.24; 137/68.28; 137/910
(58) Field of Search ................... 137/68.23, 68.24, 137/68.25, 68.26, 68.27, 68.29, 910

(56) References Cited

U.S. PATENT DOCUMENTS

| 3,709,239 | * | 1/1973 | Morcj, Jr. | 137/910 |
| 3,908,684 | * | 9/1975 | Short | 137/68.26 |
| 4,512,491 | * | 4/1985 | DeGood et al. | 137/68.24 |
| 4,590,957 | * | 5/1986 | McFarlane | 137/68.23 |
| 5,002,085 | * | 3/1991 | FitzGerald | 137/68.27 |

* cited by examiner

*Primary Examiner*—Michael Buiz
*Assistant Examiner*—Ramesh Krishnamurthy
(74) *Attorney, Agent, or Firm*—Jones, Day, Reavis & Pogue

(57) ABSTRACT

A polymer rupture disk in the form of a cartridge or capsule that can be inserted in a fluid line fixture as a replaceable unit to establish a predetermined rupture pressure or safety pressure for that particular pressurized container.

13 Claims, 1 Drawing Sheet

SELF-CONTAINED RUPTURE DISK CARTRIDGE

BACKGROUND OF THE INVENTION

1. Field of the Invention

The present invention relates in general to container pressure relieving devices and in particular to a rupture disk cartridge that has a polymer rupture disk attached and which can be hand assembled without mechanical tools and removably installed in a fluid line connected to a pressurized container.

2. Description of Related Art Including Information Disclosed Under 37 CFR 1.97 and 1.98

The problem of relieving excess pressures within containers is well known in the art and generally utilizes a rupture disk that is placed in a fluid flow line connected to the container. These rupture disks are generally formed of metal and have score lines or other features that allow them to rupture at predetermined pressures.

Such rupture disks have also been formed with Teflon® disks that are controlled primarily by the tensile strength of the Teflon® and the burst diameter of an orifice in the disk holder or flange. If a disk ruptures and has to be replaced, the replacement disk material, the Teflon®, may have a different tensile strength than the original lot. Thus, since the burst or rupture pressure of the disk is related to the tensile strength of the Teflon® as well as the diameter of the orifice it covers, this could require changes to the burst diameter orifice or a search for a Teflon® rupture disk material having the correct tensile strength to provide the proper burst pressure. It will be understood that it may be very difficult or expensive to change the orifice in the burst or rupture disk holder. Of course, it may also be expensive to search for rupture disk Teflon® material having the proper tensile strength to create the proper rupture pressure.

It would be advantageous to have a rupture disk assembly in the form of a cartridge or capsule having a predetermined burst pressure and that could be easily fabricated or taken from a supply shelf and simply inserted in the fluid line fixture to the pressurized container to replace the old one, thereby providing the proper protection for that particular container.

SUMMARY OF THE INVENTION

Thus the present invention provides shelf stocked rupture disk assemblies of various configurations for mounting in various fluid line connectors such that if a desired rupture or burst pressure is required for a particular type fitting, one can simply go to the shelf and obtain that type of rupture disk assembly having the proper configuration and rupture pressure and install it in the lines. Thus the replacement is easily and economically accomplished. The assembly includes the necessary burst diameter which can easily be changed for each lot of disks. The disk assembly provides a more convenient form of the disk for handling and shipping. Further, it provides for a method of changing the disk burst pressure in either direction easily and economically. Also, the rupture disk assembly can be customized to reduce the chance of installation of the wrong material or disk or installing the assembly in the wrong direction. Thus the present invention relates to a shelf stocked replaceable polymer rupture disk assembly in the form of a self-contained cartridge or capsule.

The assembly simply has a rupture disk holder having an orifice therein of a predetermined diameter, d, where d=BI/BP, BI=burst index and BP=burst pressure. A polymer rupture disk is attached to and supported by the rupture disk holder across the orifice and has a predetermined thickness, t, where t=BI/(BI/mil) thereby establishing a predetermined burst pressure, BP, in conjunction with the diameter, d, of the orifice in the rupture disk holder. It is well known in the art that burst pressure (BP) times burst diameter (d) equals the burst index (BI). For Teflon® then a desired thickness, t, for a given burst pressure, BP, would be determined by the equation:

$$t = BP \times d / (BI/mil),$$

where BI/mil=burst index of Teflon® per mil of thickness. Thus the thickness of the Teflon® needed can be determined by knowing the burst index (BI) of the Teflon® and the size of the orifice it must cover.

The present invention forms a polymer rupture disk assembly that can be inserted in only one direction in a fluid line to prevent incorrect installation. The novel polymer rupture disk assembly can also be provided which has a first burst pressure in one direction and a second burst pressure in the opposite direction.

The polymer rupture disk assemblies can also be made to have the same burst pressure in either direction.

The rupture disk holders can be formed of a polymer material such as Teflon® or similar material and can be hand assembled without tools simply by placing a polymer rupture disk across the orifice of known diameter in the holder and then providing an attachment means of some type to hold the polymer rupture disk fixedly across the holder orifice.

Thus it is an object of the present invention to provide a polymer rupture disk assembly as a cartridge or capsule that is designed to be easily and economically replaceable.

It is also an object of the present invention to provide a polymer rupture disk assembly that provides a more convenient form for handling and shipping.

It is still another object of the present invention to provide a polymer rupture disk assembly that can change the disk burst pressure in either direction of fluid flow through the assembly.

It is still another object of the present invention to customize the polymer rupture or disk assemblies to reduce the chance of installation of the assembly in the fluid line in the wrong direction.

Thus the present invention relates to a polymer rupture disk assembly for mounting in a fluid line to a pressurized container for establishing a predetermined rupture or burst pressure, BP, of the polymer rupture disk assembly comprising a support assembly that can be mounted in a fluid line connected to a pressurized container, a fluid flow orifice of predetermined diameter, d, in the support assembly, and a polymer rupture disk having a predetermined thickness, t, held in fluid-tight relationship over the orifice such that a predetermined rupture pressure, BP, is established by the polymer rupture assembly, the assembly being constructed for removable placement in a container fluid line to limit pressure in the container to the predetermined pressure.

Thus the assembly is in the nature of a cartridge or a capsule which can merely be used for routine maintenance or to replace a cartridge or capsule that is defective or has ruptured by simply removing the first cartridge or capsule from the fluid line fitting and then inserting the replacement cartridge or capsule into the fluid line fitting. There is no testing required, no assembly of the cartridge required, and no modifications need be made to the existing fluid lines.

BRIEF DESCRIPTION OF THE DRAWINGS

These and other objects of the present invention will be more fully disclosed when taken in conjunction with the following Detailed Description of the Invention in which like numerals represent like elements and in which.

DETAILED DESCRIPTION OF THE INVENTION

Figure 1:
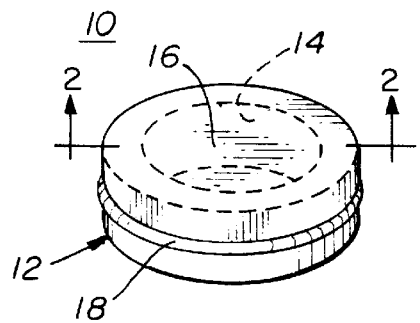
FIG. 1 is a perspective view of a polymer rupture disk capsule of the present invention.

An encapsulated polymer rupture disk 10 of the present invention is illustrated in FIG. 1. It has a rupture disk holder or support in the form of annular ring 12 having an orifice 14 of predetermine diameter. The polymer rupture disk 16 is placed over the orifice 14 and outer edges of the annular ring 12 and is it held in place by an attachment device such as a lock ring or O-ring 18 that holds the polymer rupture disk in a recess 24, best shown in FIG. 2.

Figure 2:
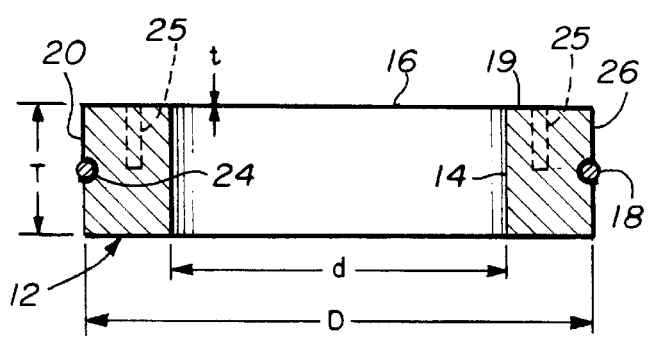
FIG. 2 is a cross-sectional view of the novel polymer rupture capsule assembly taken along lines 2—2 in FIG. 1.

Thus the entire assembly or capsule is self-contained and can be stocked on the shelf because the rupture pressure of the assembly can be calculated by knowing the diameter, d, of orifice 14 and the burst index, BI, of the polymer rupture disk 16 as shown in FIG. 2. It is well known that the burst pressure (BP) times the burst diameter (d)=the burst index (BI). The burst diameter (d) required for a given burst index (BI) is: d=BI/BP. As an example, if the burst pressure is BP=100 psig and the BI for 20 mil Teflon® is 190, the burst diameter is determined to be d=BI/BP=190/100=1.9 inches.

Thus the capsule or cartridge shown in FIG. 1 can be made with the proper orifice diameter, d, for the available polymer thickness, t, to provide any desired burst pressure. Of course, the outer diameter, D, shown in FIG. 2, can be manufactured to fit any particular fitting. It can be seen that the cartridge or capsule of FIG. 1 is easily replaceable in a fluid line fitting as will be shown hereafter. It will be noted that there are no fastening screws or mechanical assemblies required. An O-ring (or locking ring) 18 can be placed by hand over the polymer skirt 26 on the outer edge 20 of the rupture disk holder or annular ring 12. The O-ring 18 can be formed of an elastic material including Teflon® or a suitable plastic.

FIG. 2 is a cross-sectional view of the novel cartridge or capsule shown in FIG. 1. It will be noted that the rupture disk 16, typically made of Teflon®, is placed over the orifice 14 and has a skirt 26 that extends at least partially down the sides 20 of the holder 12. The rupture disk extends across recess 24 and an O-ring of some well-known type can be used to hold the rupture disk 16 in the recess 24, thus forming a cartridge or a capsule that can be tailor-made to have the proper rupture pressure for any predetermined diameter fitting. These items can be shelf stocked and, when needed, the one having the proper rupture pressure can simply be removed from the shelf and placed in the fluid line of a pressurized container to limit the pressure therein. It will be noted in FIG. 2 that the recesses may be formed such as 25 in the topside 19 of the annular disk 12. The recess itself may be partially or entirely annular in order to properly hold the polymer rupture disk over orifice 14 by press-fitting a portion of the polymer rupture disk into the recess 25 in a well-known manner.

Figure 3:
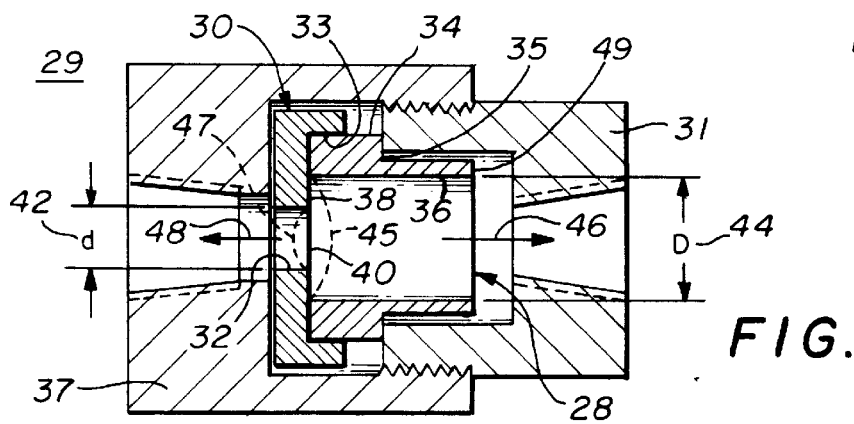
FIG. 3 is an embodiment of a capsule illustrating a first rupture pressure when fluid flows in one direction and a second rupture pressure when the fluid flows in the other direction and is made so that it can be installed in a fluid line in only one direction, thus obviating incorrect installation.

A second version of the novel capsule or cartridge is illustrated in FIG. 3. The capsule or cartridge 28 in FIG. 3 enables two different burst pressures to occur. As can be seen in FIG. 3, the cartridge or capsule 28 has a first annular ring 30 having a first orifice 32 with a first diameter 42 and a second orifice 33 having a diameter greater than diameter 42(d). This creates an annular recess 38 in the first annular ring 30 with a given depth. A second annular ring 34 has a third orifice 36 having an inside diameter 44(D) and an outer diameter such that it can be slidably inserted in the recess 38 formed in first annular ring 30. The first and third orifices 32, 36 are axially aligned. By placing a polymer rupture disk 40 between first annular ring 30 and second annular ring 34, a cartridge or capsule is obtained. Note that if the pressure is in the direction of arrow 46, that the polymer rupture disk 40 extends into the diameter 44 of the orifice in second annular ring 34 as shown by dashed line 45. However, if fluid flows in the direction of arrow 48, the polymer rupture disk 40 extends in the opposite direction, as shown by dashed line 47, across a smaller diameter 42 thus establishing a different rupture pressure. It will be noted that the end surface 49 of the second annular ring 34 has a length greater than, or is above the shoulder 35 on the annular ring 34. This construction provides for a one-way installation in a fluid line fitting and thus cannot be improperly installed.

If, however, it is desired, the portion of the second annular ring 34 from the shoulder 35 to the surface 49 could be removed to cause a single surface at the location of shoulder 35. This cartridge or capsule 28 could then be placed in a fluid line with fluid flow in either direction. It would allow easier installation but the direction of installation would have to be carefully monitored.

Figure 4:
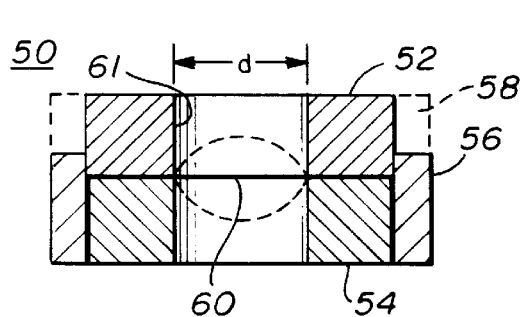
FIG. 4 is another version of a polymer rupture disk capsule that has the same rupture pressure with fluid flow in either direction and therefore can be installed in either fluid flow direction in the fluid line.

FIG. 4 is still another version of the novel cartridge or capsule 50. In this case it has a first annular ring 52 and a second annular ring 54, both having the same inside diameter 61 and the same outside diameter. A polymer rupture disk 60 is placed between the two annular rings 52 and 54 and the rings are held in place by a third annular ring 56 that is press-fit over the outer diameter of abutting rings 52 and 54. Again, this cartridge or capsule could be constructed with or without shoulders 58 so that it could be placed in a fluid line in only one direction of fluid flow or it could be placed in a fluid line with either direction of fluid flow.

Figure 5:
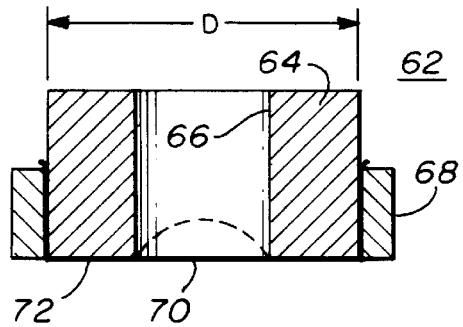
FIG. 5 is still another version of the novel polymer rupture disk capsule in which the flow is only from one direction, with the disk also providing a gasket seal thus isolating downstream components from system fluids. Downstream components may then be made from less expensive materials such as high-density polyethylene instead of Teflon®.

Another possible version of the novel capsule or cartridge is illustrated in FIG. 5 wherein there is a single annular ring 64 having an outer diameter, D, and an orifice 66 having an inside diameter. The polymer rupture disk 70 is placed over the orifice 66 and held in place by a fastening ring 68 that goes over the skirt 72 of the polymer rupture disk 70 and entraps it when second fastening ring 68 is slidably mounted over the outside diameter, D, of the first ring 64.

It will be understood of course that these are simply examples of the various shapes of the cartridges or capsules that could be manufactured. Since each manufacturer may have its own fitting shape for mounting a cartridge or capsule in a fluid line, these capsules or cartridges can be readily manufactured to fit any particular size.

Figure 6:
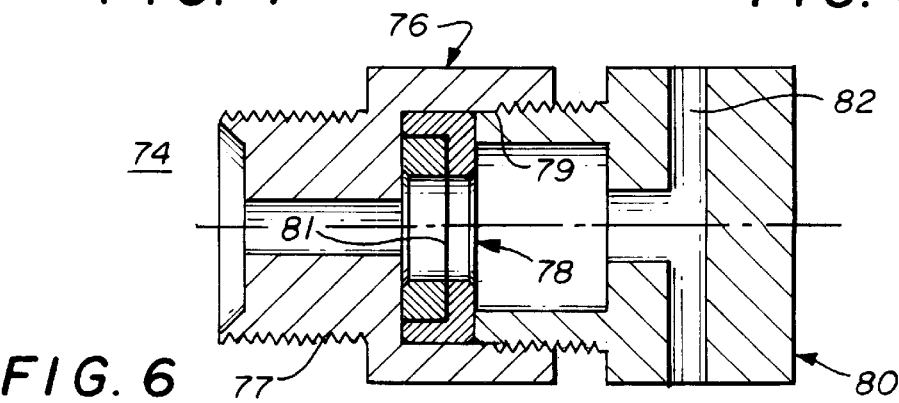
FIG. 6 is a cross-sectional view of a fluid line fitting with a capsule installed therein and held in place by a mounting cap.

FIG. 6 is a cross-sectional view of a fitting for a pressurized container fluid line illustrating one of the cartridges installed therein. In FIG. 6, the polymer rupture disk mounting assembly comprises a fluid line fitting 76 having thread 77 for threadedly engaging the fluid line. The polymer rupture disk assembly 78 is installed in the recess 79 in fitting 76 and a cap 80 is threadedly engaged with the fluid line fitting 76 to securely hold the capsule or cartridge 78 in place. When the rupture disk 81 ruptures, the fluid exits cap 80 through the ports 82 to relieve the pressure in the container.

It can be seen by looking at FIG. 6 that any one of the cartridges or capsules shown in FIGS. 1, 3, 4, and 5 could be placed therein. In addition, other versions could be placed therein. The important concept is to have a cartridge that is preloaded to give an outside diameter for fitting in a fluid line and a predetermined rupture pressure. The fitting can exist in any desired manner. It can be a fixture that allows two different rupture pressures in opposite directions, it can be a fixture that allows one rupture pressure in one direction only, or it can be constructed as to be placed in a fixture so that fluid can flow through the rupture assembly in either direction with the same rupture pressure.

Thus, as been disclosed a novel cartridge or capsule performing a polymer rupture disk assembly that can be removably replaced in any given fluid line with the proper rupture pressure and can be stocked as replacement units rather than having to reconstruct a new one each time a rupture occurs.

The corresponding structures, materials, acts, and equivalents of all means in the claims below are intended to include any structure, material, or act for performing the function in combination with other claimed elements as specifically claimed.

What is claimed is:

1. A self-contained rupture disk cartridge for removable fluid-tight mounting in a fluid line connected to a pressurized container to establish a maximum pressure in said container by rupturing upon reaching a predetermined burst pressure, BP, said rupture disk cartridge comprising:
    a cylindrical-shaped rupture disk holder having an outer side wall with a selected diameter and an opening with a predetermined diameter, d, where d=BI/BP and BI=burst index; and
    a polymer rupture device having a disk portion with a diameter substantially equal to said selected diameter and an outer annular skirt extending along said outer side wall of said cylindrical-shaped rupture disk holder such that said polymer rupture device is supported by said rupture disk holder across at least said opening, said polymer rupture device having a predetermined thickness, t, where t=BI/(BI/mil) thereby establishing said predetermined burst pressure, BP, in conjunction with the diameter, d, of said opening in said rupture disk holder.

2. A self-contained rupture disk assembly for removable fluid-tight mounting in a fluid line connected to a pressurized container to establish a maximum pressure in said container by rupturing upon reaching a predetermined burst pressure, BP, said rupture disk assembly comprising:
    a cylindrical-shaped rupture disk holder having an outer side wall with a selected diameter and an orifice with a predetermined diameter, d, where d=BI/BP and BI=burst index;
    a polymer rupture device having a disk portion with a diameter substantially equal to said selected diameter and an outer skirt extending along said outer side wall of said rupture disk holder such that said polymer rupture device is supported by said rupture disk holder across at least said orifice, said polymer rupture device having a predetermined thickness, t, where t=BI/(BI/mil) thereby establishing said predetermined burst pressure, BP, in conjunction with the diameter, d, of said orifice in said rupture disk holder; and
    attachment means associated with said rupture disk holder for maintaining said rupture disk in fixed relationship over said orifice in said rupture disk holder so as to establish said predetermined burst pressure, BP, when mounted in said fluid line.

3. The rupture disk assembly of claim 2 wherein said cylindrical-shaped rupture disk holder comprises:
    an annular ring having first and second sides a predetermined inside diameter, d, said selected diameter equal to, D, and with a thickness;
    a recess defined by an arcuate portion of said annular ring; and
    said attachment means cooperating with said recess for holding said polymer rupture device in fluid tight relationship across at least said inside diameter, d, of said rupture disk holder when said rupture disk assembly is placed in said fluid line.

4. The rupture disk assembly of claim 3 wherein:
    said recess is an annular recess formed in said outer side wall; and
    said attachment means comprises a locking ring engaging said outer skirt of said polymer rupture disk in said recess to affix said polymer rupture disk to said annular ring.

5. The rupture disk assembly of claim 4 wherein said locking ring is an elastic O-ring.

6. The rupture disk assembly of claim 3 wherein:
    said recess is an annular recess formed in one of said first and second sides of said annular ring for receiving said polymer rupture device in a press-fit engagement to affix said polymer rupture disk to said annular ring.

7. The rupture disk assembly of claim 2 wherein said rupture disk holder comprises:
    a first annular ring having axially aligned first and second orifices, said second orifice having a larger diameter than said first orifice so as to form an annular recess having a depth in said first annular ring;
    a second annular ring having a selected length and a third orifice therein axially aligned with said first and second orifices said third orifice having a diameter different than said diameter of said first orifice and said second annular ring having an outside diameter such that the second annular ring can be press-fit within said annular recess in said first annular ring; and
    said polymer rupture device placed between said third orifice of said second annular ring and said first orifice of said first annular ring in a fluid tight relationship wherein said disk portion with a diameter substantially equal to said outside diameter of said second annular ring to form said self-contained rupture disk assembly that can be inserted in said fluid line for fluid flow through said assembly in either of two fluid flow directions to establish either one of a first and a second different predetermined burst pressure, BP.

8. The rupture disk assembly of claim 7 wherein said selected length of said second annular ring is greater than the depth of said annular recess in which it is press-fit such that a portion of the second annular ring extends beyond the recess formed in said first annular ring to form a rupture disk assembly that can be inserted in said fluid line for fluid flow therethrough in only one direction to establish a predetermined burst pressure, BP.

9. The rupture disk assembly of claim 2 wherein the rupture disk holder comprises:

first and second annular rings each having said selected diameter and axially aligned orifices in abutting relationship and retaining said polymer rupture device between them to cover said axially aligned orifices in a fluid tight relationship; and a press-fit fastener engaging each of said first and second annular rings and holding them in abutting relationship with each other and with said polymer rupture device between them thus forming a rupture disk assembly that can be removably inserted in a pressurized container fluid line to establish a predetermined burst pressure, BP, for said container.

10. The rupture disk assembly of claim 2 wherein the rupture disk holder comprises:

a single annular ring having an orifice extending axially through said single annular ring and having said selected diameter; and said attaching means comprising a fastening device for press-fit relationship with said outer diameter of said single annular ring so as to force and hold the skirt of said polymer rupture device in fixed relationship over said orifice in said single annular ring thereby forming a rupture disk assembly that can be inserted in a fluid line of a pressurized container to establish a predetermined burst pressure, BP, for said container.

11. A self-contained rupture disk assembly for removable fluid-tight mounting in a fluid line connected to a pressurized container to establish a maximum pressure in said container by rupturing upon reaching a predetermined burst pressure, BP, said rupture disk assembly comprising:

an annular ring having first and second sides and a selected thickness therebetween and further having an outer wall with a selected diameter and an orifice with a predetermined diameter, d, where d=BI/BP and BI=burst index, one of said first and second sides defining an annular recess;

a polymer rupture disk supported by said annular ring across at least said orifice and having an outer skirt with a diameter greater than diameter of said annular recess and a predetermined thickness, t, where t=BI/(BI/mil) thereby establishing said predetermined burst pressure, BP, in conjunction with the diameter, d, of said orifice in said annular ring; and said polymer rupture disk in a press-fit engagement with said annular recess for maintaining said rupture disk in fixed relationship over said orifice in said annular ring so as to establish said predetermined burst pressure, BP, when mounted in said fluid line.

12. A self-contained rupture disk assembly for removable fluid-tight mounting in a fluid line connected to a pressurized container to establish a maximum pressure in said container by rupturing upon reaching a predetermined burst pressure, BP, said rupture disk assembly comprising:

a cylindrical-shaped rupture disk holder having an outer side wall with a selected diameter and an opening with a predetermined diameter, d, where d=BI/BP and BI=burst index, said outer wall defining an annular recess encircling said cylindrical-shaped rupture disk holder;

a polymer rupture device having a disk portion with a diameter substantially equal to said selected diameter and an outer skirt extending away from said disk portion and supported by said rupture disk holder across at least said opening and having a predetermined thickness, t, where t=BI/(BI/mil) thereby establishing said predetermined burst pressure, BP, in conjunction with the diameter, d, of said opening in said rupture disk holder; and a locking ring for engaging said outer skirt of said polymer rupture device in said annular recess to secure said polymer rupture device to said rupture disk holder in a fluid-tight relationship when said rupture disk assembly is placed in said fluid line.

13. A self-contained rupture disk assembly for removable fluid-tight mounting in a fluid line connected to a pressurized container to establish a maximum pressure in said container by rupturing upon reaching a predetermined burst pressure, BP, said rupture disk assembly comprising:

a single annular ring having an outer diameter and an orifice with a predetermined diameter, d, where d=BI/BP and BI=burst index;

a polymer rupture disk having a predetermined thickness, t, and supported by said single annular ring such that said polymer rupture disk covers said orifice and has an outer skirt that extends beyond said outer diameter of said single annular ring, where t=BI/(BI/mil), thereby establishing said predetermined burst pressure, BP, in conjunction with the diameter, d, of said orifice; and a fastening device for a press-fit relationship with said outer diameter of said single annular ring so as to force and hold said skirt of said polymer rupture disk in a fixed relationship over said orifice in said single annular ring thereby forming a receptive disk assembly that can be inserted in a fluid line of a pressurized container to establish a predetermined burst pressure, BP, for said container.

\* \* \* \* \*